(12) United States Patent
Yamazaki et al.

(10) Patent No.: US 12,469,260 B2
(45) Date of Patent: Nov. 11, 2025

(54) INFORMATION PROCESSING APPARATUS, METHOD, AND STORAGE MEDIUM TO GENERATE A LIKELIHOOD MAP

(71) Applicant: CANON KABUSHIKI KAISHA, Tokyo (JP)

(72) Inventors: Fukashi Yamazaki, Kanagawa (JP); Yuta Narukiyo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 18/057,980

(22) Filed: Nov. 22, 2022

(65) Prior Publication Data

US 2023/0169757 A1 Jun. 1, 2023

(30) Foreign Application Priority Data

Nov. 26, 2021 (JP) ................................ 2021-192190

(51) Int. Cl.
*G06V 10/774* (2022.01)
*G06T 7/11* (2017.01)
*G06V 10/25* (2022.01)

(52) U.S. Cl.
CPC .............. *G06V 10/774* (2022.01); *G06T 7/11* (2017.01); *G06V 10/25* (2022.01); *G06T 2207/20076* (2013.01); *G06T 2207/20081* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 2016/0086326 A1* | 3/2016 | Raschke | G06T 7/11 382/131 |
| 2017/0287133 A1* | 10/2017 | Esparza Manzano | G06T 19/00 |
| 2018/0153619 A1* | 6/2018 | Kustra | A61B 10/04 |
| 2020/0380675 A1* | 12/2020 | Golden | G06T 7/0012 |
| 2021/0327055 A1* | 10/2021 | Putha | G06V 10/774 |
| 2022/0215646 A1* | 7/2022 | Park | G06V 10/82 |
| 2022/0230310 A1* | 7/2022 | Xie | G06T 7/12 |
| 2023/0138666 A1* | 5/2023 | Husta | A61B 6/463 600/117 |

FOREIGN PATENT DOCUMENTS

JP 2018518277 A 7/2018

OTHER PUBLICATIONS

Kaiming He, et al., "Delving Deep into Rectifiers: Surpassing Human-Level Performance . . . ", International Conference on Computer Vision, 2015, pp. 1026-1034.
M. Najibi, et al., "Towards the Success Rate of One: Real-time Unconstrained . . . ", arXiv: 1708.00079 v2, Aug. 2, 2017, 11 pages.

* cited by examiner

*Primary Examiner* — Leon Viet Q Nguyen
(74) *Attorney, Agent, or Firm* — Canon U.S.A., Inc. I.P. Division

(57) ABSTRACT

An information processing apparatus includes an acquisition unit configured to acquire first information including information indicating a position and a size of a target in training image data and second information including information indicating a constraint regarding a region of the target, and a generation unit configured to generate a likelihood map indicating likeliness of being the target as ground-truth image data corresponding to the training image data based on the first information and the second information.

18 Claims, 7 Drawing Sheets

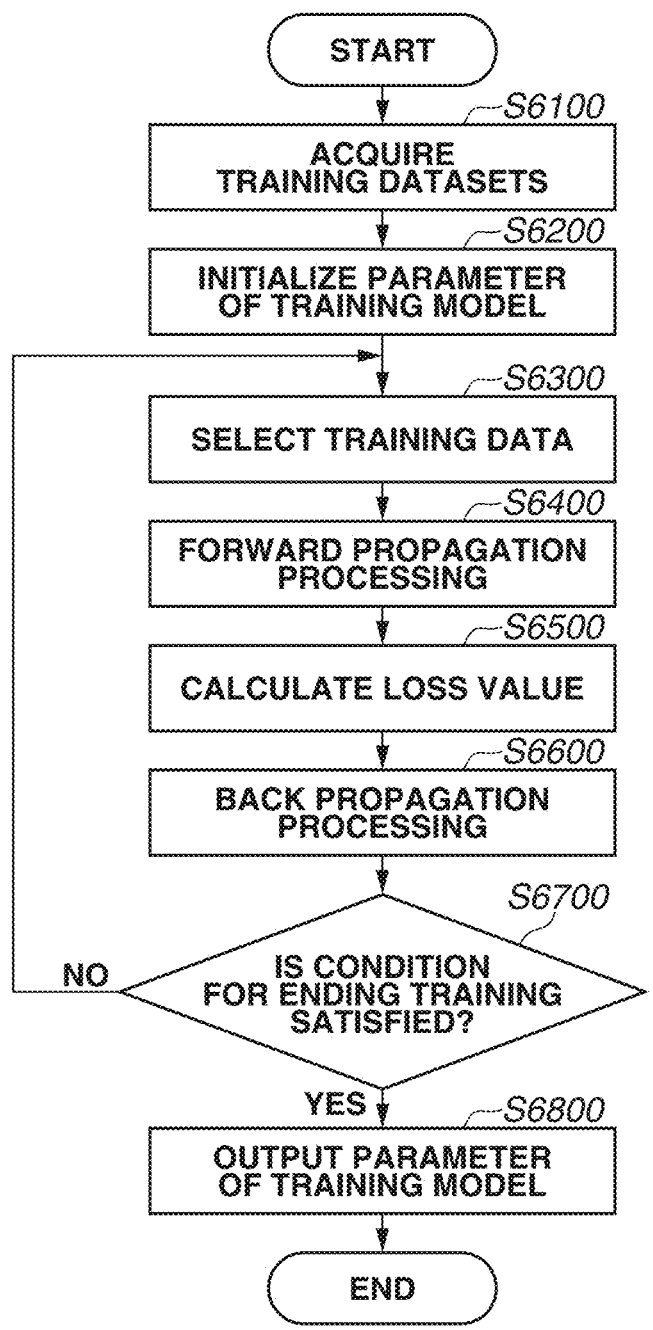

INFORMATION PROCESSING APPARATUS, METHOD, AND STORAGE MEDIUM TO GENERATE A LIKELIHOOD MAP

BACKGROUND

Field

The disclosure of the present specification generally relates to information processing and, more particularly, to an information processing apparatus that generates ground-truth image data, an information processing method, and a non-transitory storage medium to generate a likelihood map.

Description of the Related Art

The accuracy of segmentation based on machine learning depends on the number of pieces of training data including training image data and ground-truth image data, which makes it desirable to prepare a large number of pieces of training data. The preparation of the ground-truth image data is laborious work, and a technique for efficiently generating the ground-truth image data is important. For example, M. Najibi et al.'s "Towards the Success Rate of One: Real-time Unconstrained Salient Object Detection", arXiv: 1708.00079 v2, 2017 discloses a technique that generates ground-truth image data (a ground-truth likelihood map) indicating likeliness of being a target based on a bounding box indicating a rectangular frame that surrounds the target.

In the technique for generating the ground-truth image data disclosed in M. Najibi et al., the ground-truth image data is generated according to the width and the height of the bounding box. That can reduce the accuracy of approximating the actual region of the target depending on the ground-truth image data.

SUMMARY

The present disclosure is directed to providing an information processing apparatus that efficiently and accurately generates ground-truth image data indicating a region of a target.

According to an aspect of the present disclosure, an information processing apparatus includes an acquisition unit configured to acquire first information including information indicating a position and a size of a target in training image data and second information including information indicating a constraint regarding a region of the target, and a generation unit configured to generate a likelihood map indicating likeliness of being the target as ground-truth image data corresponding to the training image data based on the first information and the second information.

Further features of the present disclosure will become apparent from the following description of exemplary embodiments with reference to the attached drawings.

BRIEF DESCRIPTION OF THE DRAWINGS

FIG. 6 illustrates an example of a processing procedure by the information processing apparatus according to the first exemplary embodiment.

DESCRIPTION OF THE EMBODIMENTS

Figure 1:
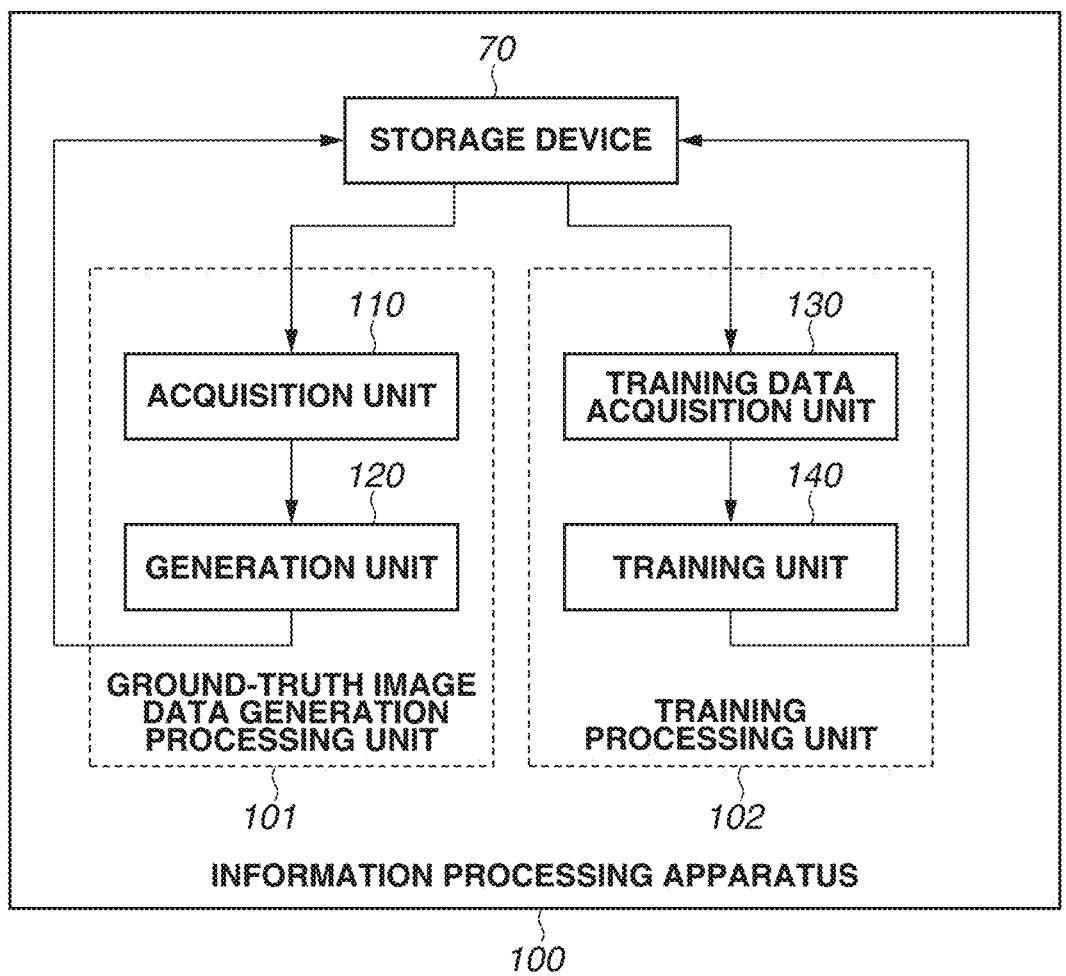
FIG. 1 illustrates an example of the functional configuration of an information processing apparatus according to a first exemplary embodiment.

In the following description, exemplary embodiments of an information processing apparatus disclosed in the present specification will be described with reference to the drawings. In the exemplary embodiments will be described, like reference numerals will refer to like components, members, or steps illustrated in the individual drawings, and redundant descriptions will be omitted as appropriate. Further, in each of the drawings, some components, members, and steps will be omitted as appropriate for illustration.

In the following description, the exemplary embodiments of the present disclosure will be described citing a liver tumor extracted in an abdominal computed tomography (CT) image data captured by an X-ray computed tomography (X-ray CT) apparatus as an example. However, in addition to a liver tumor, the present disclosure is applicable to another lesion (for example, a pulmonary nodule, a lymph node, or a bone metastasis) and every other structure. Further, the present disclosure is also applicable to tomographic image data captured by a nuclear magnetic resonance imaging (MRI) apparatus, a positron emission tomography (PET) apparatus, an ultrasonic imaging apparatus, or other arrangements, and ordinary image data captured by a camera or other arrangements. Further, the present disclosure is applicable to image data that is two-dimensional image data, three-dimensional image data, or other multi-dimensional image data. Further, the present disclosure is also applicable to image data formed by imaging an ordinary object. Exemplary embodiments of the present disclosure shall not be limited to the following exemplary embodiments.

A first exemplary embodiment will be described with reference to FIG. 1. The present exemplary embodiment will be described regarding a method that sets the liver tumor as a target, approximates the liver tumor with an ellipsoid, and generates a likelihood map indicating likeliness of being a region of the liver tumor (hereinafter referred to as a liver tumor likelihood map) as ground-truth image data corresponding to training image data. An information processing apparatus 100 according to the present exemplary embodiment first acquires the central coordinates of the ellipsoid approximating the liver tumor and radii thereof in orthogonal three axes as first information indicating the position and the size of the liver tumor in the training image data. Further, the information processing apparatus 100 acquires mask image data indicating a region of the liver containing the liver tumor (hereinafter referred to as liver mask image data) as second information including information indicating a constraint regarding the region of the liver tumor. Then, the information processing apparatus 100 generates a liver tumor likelihood map based on the first information and the second information. Then, the likelihood map is a likelihood map that satisfies the constraint regarding the region of the target based on the second information.

The information processing apparatus 100 generates the liver tumor likelihood map based on the central coordinates of the liver tumor and the radii thereof in the orthogonal three axes, which are the first information, and the liver mask image data, which is the second information including the information indicating the constraint regarding the region of the liver tumor.

More specifically, the information processing apparatus 100 generates an initial likelihood map in an expanded ellipsoidal (as the likelihood changes concentrically) therein using the central coordinates of the liver tumor and the radii thereof in the orthogonal three axes as parameters of the ellipsoid, which are the first information. At this time, the liver has a region containing the liver tumor. The liver tumor is considered not to exist outside the region of the liver. Thus, the information processing apparatus 100 generates a liver tumor likelihood map in such a manner that the likelihood of the liver tumor is set to 0 at a voxel outside the region of the liver therein using the liver mask image data, which is the second information. In other words, the information processing apparatus 100 generates the likelihood map indicating the likeliness of being the region of the liver tumor by making a correction to the initial likelihood map to satisfy the constraint regarding the region of the target that the liver tumor does not exist outside the region of the liver.

Further, the information processing apparatus 100 according to the present exemplary embodiment trains a training model by a method based on machine learning using the training image data and the likelihood map indicating the likeliness of being the region of the liver tumor that is generated in correspondence with the training image data as the ground-truth image data. In other words, the information processing apparatus 100 trains the training model using training data including abdominal computed tomography (CT) image data as the training image data and the liver tumor likelihood map corresponding to the abdominal CT image data as the ground-truth image data. In the present exemplary embodiment, a three-dimensional (3D) U-Net, which is one of convolutional neural networks (CNNs), among deep learning techniques, is used as the training model. Training the 3D U-Net using the above-described training data allows the information processing apparatus 100 to infer a region that is likely to be the liver tumor.

In the following description, the functional configuration of the information processing apparatus 100 according to the present exemplary embodiment will be described with reference to FIG. 1. As illustrated in FIG. 1, the information processing apparatus 100 includes a ground-truth image data generation processing unit 101, which includes an acquisition unit 110 and a generation unit 120, and a training processing unit 102, which includes a training data acquisition unit 130 and a training unit 140. Further, the information processing apparatus 100 according to the present exemplary embodiment includes a storage device 70. The ground-truth image data generation processing unit 101 and the training processing unit 102 may function as an information processing system formed as a different apparatus.

The storage device 70 is an example of a computer-readable storage medium, and is a mass-storage device represented by a hard disk drive (HDD) and a solid state drive (SSD). The storage device 70 stores therein the training image data from which the target is extracted, the first information including the information indicating the position and the size of the target in the training image data, and the second information including the information indicating the constraint regarding the region of the target. The present exemplary embodiment will be described, assuming that the target is the liver tumor and the training image data is the abdominal CT image data as an example. Further, the first information is information including the central coordinates of the liver tumor and the radii thereof in the orthogonal three axes, and the second information is information including the liver mask image data, which is the portion where the liver tumor exists.

In the first information stored in the storage device 70, the central coordinates of the liver tumor are, for example, coordinate values in an image coordinate system corresponding to the abdominal CT image data, and expressed as the respective coordinate values in the X axis, the Y axis, and the Z axis, like $(c_x, c_y, c_z)$. Further, the radii in the orthogonal three axes, which are included in the first information, are, for example, the respective radii of the liver tumor in the X-axis direction, the Y-axis direction, and the Z-axis direction when the reference is placed at the central coordinates of the liver tumor, and are expressed like $(r_x, r_y, r_z)$. Values of, for example, the central coordinates of the liver tumor and the radii thereof in the orthogonal three axes, which are included in the first information, are values annotated by, for example, a doctor or a radiologist. The above-described forms for expressing the central coordinates of the liver tumor and the radii thereof in the orthogonal three axes are examples, and they may be expressed in any form capable of expressing the respective characteristics. Further, the first information may be vertex coordinates defining a cuboid circumscribed on the ellipsoid approximating the shape of the liver tumor.

In the second information stored in the storage device 70, the liver mask image data has the same image size as the abdominal CT image data. The liver mask image date is binary image data in which the value of the voxel corresponding to a voxel at which the liver is extracted in the abdominal CT image data is expressed as 1 and the value of a voxel other than that is expressed as 0. The above-described form for expressing the liver mask image is an example, and the liver mask image may be expressed in any form capable of expressing the region of the liver. For example, the second information may be an image that expresses the likeliness of being the liver of each voxel in multiple value format. The storage device 70 may be configured as a different device from the information processing apparatus 100, which will be described below. The function of each unit included in the information processing apparatus 100 will be described in detail.

The acquisition unit 110 acquires the training image data and the first information and the second information in this training image data from the storage device 70, and transmits the first information and the second information to the generation unit 120. In other words, the acquisition unit 110 acquires the central coordinates of the liver tumor and the radii thereof in the orthogonal three axes, which are the first information, and the liver mask image data, which is the second information, in the training image data from the storage device 70, and transmits them to the generation unit 120.

The generation unit 120 receives the first information and the second information in the training image data from the acquisition unit 110. Then, the generation unit 120 generates the likelihood map indicating the likeliness of being the target by generating the initial likelihood map indicating a rough region of the target based on the first information and correcting this initial likelihood map based on the above-described second information. This likelihood map indicating the likeliness of being the target is the ground-truth image data corresponding to the training image data. The generation unit 120 stores the generated likelihood map of the target into the storage device 70 as the ground-truth image data corresponding to the training image data.

In other words, the generation unit 120 generates the likelihood map indicating the likeliness of being the region of the liver tumor to satisfy the constraint set based on the liver mask image data, which is the second information, based on the central coordinates of the liver tumor and the radii thereof in the orthogonal three axes, which are the first information. Then, the generation unit 120 stores the likelihood map indicating the likeliness of being the region of the liver tumor into the storage device 70 as the ground-truth image data corresponding to the training image data. The liver tumor likelihood map has the same image size as the abdominal CT image data, and is image data in continuous value format in which a voxel having a high likelihood of the liver tumor is expressed as a value close to 1 and a voxel having a low likelihood of the liver tumor is expressed as a value close to 0. The above-described form for expressing the liver tumor likelihood map is an example, and the liver tumor likelihood map may be expressed in any form capable of expressing a high/low likelihood of the liver tumor.

The training data acquisition unit 130 receives a plurality of pieces of training image data and pieces of ground-truth image data indicating the likelihood maps of the target corresponding to the pieces of training image data, respectively, from the storage device 70, and transmits them to the training unit 140. Now, the likelihood map of the target is the ground-truth image data generated by the generation unit 120. In other words, the training data acquisition unit 130 acquires training datasets including a plurality of pieces of abdominal CT image data as the training image data and a plurality of liver tumor likelihood maps corresponding to the plurality of pieces of abdominal CT image data, respectively, as the ground-truth image data from the storage device 70, and transmits them to the training unit 140. The training image data acquired at this time may be data resulting from processing the training data including the ground-truth image data generated by the above-described ground-truth image data generation processing unit 101.

The training unit 140 receives the pieces of training image data and the pieces of ground-truth image data indicating the likelihood maps of the target corresponding to the pieces of training image data, respectively, from the training data acquisition unit 130. Next, the training unit 140 initializes parameters of the training model. Subsequently, the training unit 140 trains the training model by the method based on machine learning using the pieces of training image data and the pieces of ground-truth image data indicating the likelihood maps of the target corresponding to the target images, respectively, as the training datasets. Then, the parameters of the trained training model are stored into the storage device 70. In the present exemplary embodiment, the training model is the 3D U-Net, which is one of CNNs. In other words, the training unit 140 trains the 3D U-Net using the pieces of abdominal CT image data and the liver tumor likelihood maps corresponding to the pieces of CT image data, respectively, as the training datasets. Further, the training model trained by the training unit 140 may be used in inference processing. Further, this trained training model can also be applied to inference processing on another information processing apparatus.

At least some individual units included in the information processing apparatus 100 illustrated in FIG. 1 may be independent devices. In some embodiments, these units are generally refer to software, firmware, hardware, circuitry, or combinations thereof that have respective functions or are used to effectuate a purpose. In the present exemplary embodiment, the individual units each are software.

Figure 2:
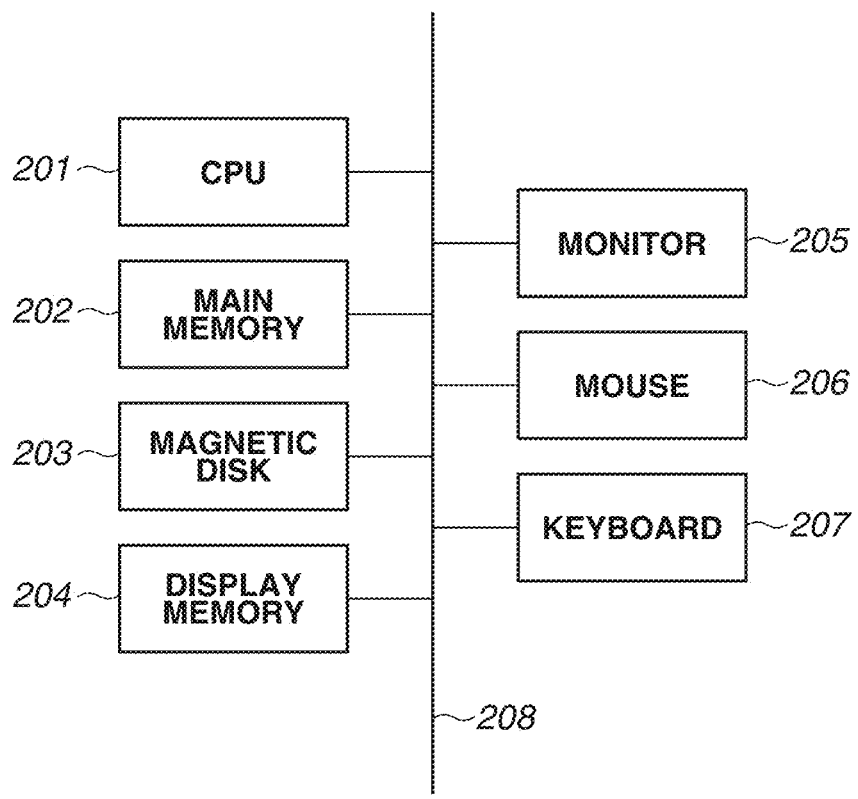
FIG. 2 illustrates an example of the hardware configuration of the information processing apparatus according to the first exemplary embodiment.

FIG. 2 illustrates an example of the hardware configuration of the information processing apparatus 100. The information processing apparatus 100 has the configuration of a known computer (information processing apparatus). The information processing apparatus 100 includes a central processing unit (CPU) 201, a main memory 202, a magnetic disk 203, a display memory 204, a monitor 205, a mouse 206, and a keyboard 207 as the hardware configuration thereof.

The CPU 201, which includes one or more processors, circuitry, or combinations thereof, mainly controls the operation of each component. The main memory 202, for example, stores therein control programs that the CPU 201 runs, and provides a work area when the CPU 201 runs a program. The magnetic disk 203 stores therein an operating system (OS), a device driver as a peripheral device, and programs for implementing various kinds of application software including a program for performing processing that will be described below. The functions (the software) of the information processing apparatus 100 illustrated in FIG. 1 and the processing illustrated in flowcharts that will be described below are implemented by the CPU 201 running programs stored in the main memory 202, the magnetic disk 203, or another storage device.

The display memory 204 temporarily stores display data therein. The monitor 205 is, for example, a cathode ray tube (CRT) monitor, a liquid crystal monitor, or other monitor, and displays images, text, and other types of information based on the data from the display memory 204. The mouse 206 and the keyboard 207 receive a pointing input and an input of a character and other types of information provided by a user, respectively. Each of the above-described components is mutually communicably connected via a common bus 208.

The CPU 201 corresponds to an example of a processor or a control unit. The information processing apparatus 100 may include at least a graphics processing unit (GPU) or a field-programmable gate array (FPGA) in addition to the CPU 201. In other embodiments, the information processing apparatus 100 include at least a GPU or an FPGA instead of the CPU 201. The main memory 202 and the magnetic disk 203 correspond to an example of a memory or a storage device.

Figure 3:
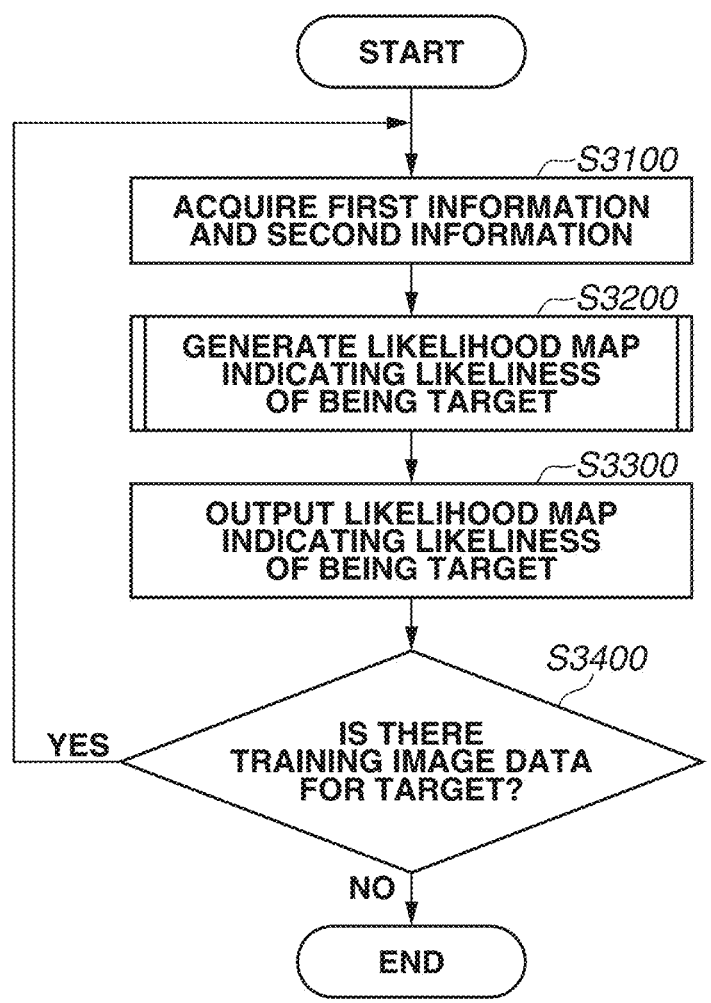
FIG. 3 illustrates an example of a processing procedure by the information processing apparatus according to the first exemplary embodiment.
Figure 4:
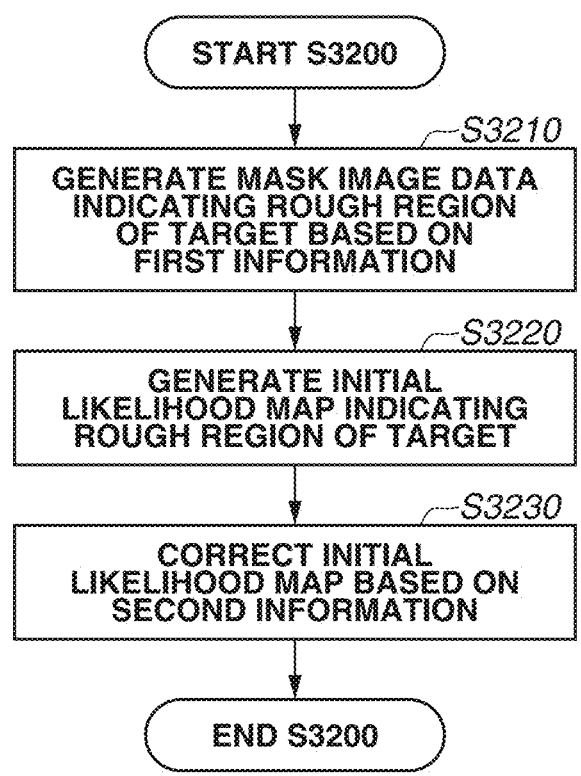
FIG. 4 illustrates an example of a processing procedure by the information processing apparatus according to the first exemplary embodiment.

Next, a series of processing regarding processing procedures performed by the information processing apparatus 100 according to the present exemplary embodiment will be described with reference to FIGS. 3 and 6. First, a processing procedure performed by the ground-truth image data generation processing unit 101 in the information processing apparatus 100 will be described with reference to FIG. 3.

(Step S3100)

In step S3100, the acquisition unit 110 acquires the central coordinates of the liver tumor and the radii thereof in the orthogonal three axes, which are the first information, and the liver mask image data, which is the second information, in the training image data from the storage device 70, and transmits the acquired information to the generation unit 120.

(Step S3200)

In step S3200, the generation unit 120 receives the central coordinates of the liver tumor and the radii thereof in the orthogonal three axes, which are the first information, and the liver mask image data as the image data, which is the second information. Next, the generation unit 120 generates mask image data indicating the rough region of the liver tumor based on the central coordinates of the liver tumor and the radii thereof in the orthogonal three axes, which are the first information. Subsequently, the generation unit 120 generates the initial likelihood map indicating the rough region of the liver tumor from the mask image data indicating the rough region of the liver tumor. Then, the generation unit 120 generates the likelihood map indicating the likeliness of being the region of the liver tumor by correcting the initial likelihood map indicating the rough region of the liver tumor to satisfy the constraint set based on the liver mask image data, which is the second information.

The processing in step S3200 will be described in detail with reference to FIGS. 4 and 5A to 5E.

Figure 5A:
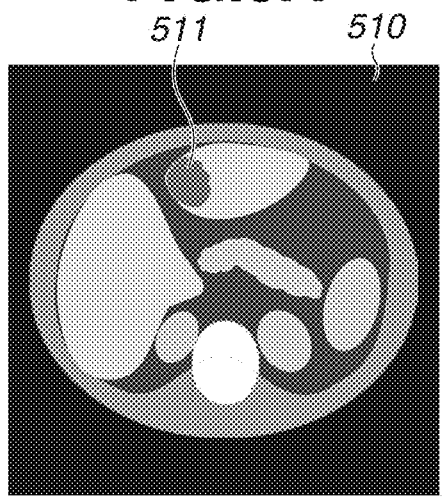
FIGS. 5A to 5E illustrate images according to the first exemplary embodiment.
Figure 5B:
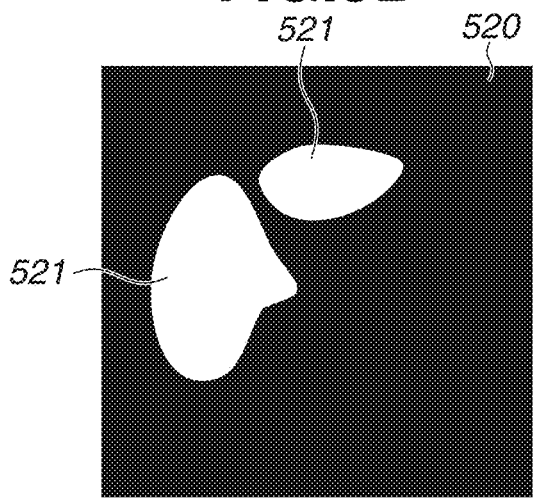
Figure 5C:
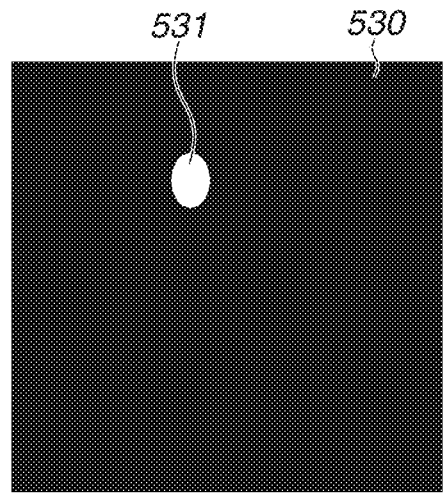
Figure 5D:
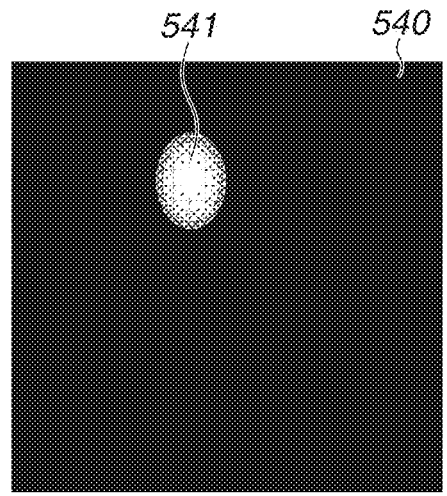

Among these drawings, FIG. 5A illustrates abdominal CT image data 510, which is training image data in which a liver tumor 511 is extracted, and FIG. 5B is liver mask image data 520, which is the second information.

A liver region 521 is stored in the liver mask image data 520, and it is assumed that a voxel value in the liver region 521 is expressed as 1 (a light color) and a voxel value other than that is expressed as 0 (a dark color) as an example.

(Step S3210)

In step S3210, the generation unit 120 generates the mask image data indicating the rough region of the liver tumor based on the first information. In the present exemplary embodiment, the generation unit 120 generates the initial liver tumor likelihood map by approximating the liver tumor with the ellipsoid. The generation unit 120 first generates mask image data 530 about the ellipsoid indicating the rough region of the liver tumor using the central coordinates of the liver tumor and the radii thereof in the orthogonal three axes (not illustrated), which are the first information, as the parameters of the ellipsoid. More specifically, the generation unit 120 takes a voxel corresponding coordinates (x, y, z) satisfying the following condition as a voxel belonging to the ellipsoid indicating the rough region of the liver tumor.

$$\frac{(x-c_x)^2}{r_x^2} + \frac{(y-c_y)^2}{r_y^2} + \frac{(z-c_z)^2}{r_z^2} \leq 1 \quad \text{[Expression 1]}$$

In Expression 1, $(c_x, c_y, c_z)$ represents the central coordinates of the liver tumor in the image coordinate system, and $(r_x, r_y, r_z)$ represents the radii in the respective axial directions with the reference placed at the central coordinates of the liver tumor, respectively.

The mask image data 530 about the ellipsoid stores an ellipsoidal region 531 indicating the rough region of the liver tumor therein, and is assumed to express a voxel value in the ellipsoidal region 531 as 1 (a light color) and a voxel value other than that as 0 (a dark color) as an example. In other words, a voxel satisfying the condition indicated in Expression 1 has a value of 1, and a voxel other than that has a value of 0 in the mask image data 530 about the ellipsoid.

(Step S3220)

In step S3220, the generation unit 120 generates the initial likelihood map indicating the rough region of the liver tumor based on the mask image data indicating the rough region of the liver tumor generated in step S3210. More specifically, the generation unit 120 generates a likelihood map in such a manner that the likelihood indicating the likeliness of being the region of the liver tumor is lower with a farther distance from around the central coordinates of the liver tumor therein with respect to the ellipsoidal region 531 generated in step S3210. In the present exemplary embodiment, the generation unit 120 generates the initial likelihood map 540 indicating the rough region of the liver tumor by generating the mask image data 530 about the ellipsoid indicating the rough region of the liver tumor and applying a Gaussian filter to this mask image data to thus blur the ellipsoidal region 531. The method for blurring the ellipsoidal region 531 is not limited to the Gaussian filter and may be any known method serving as a smoothing method. In sum, the generation unit 120 generates the initial likelihood map indicating the rough region of the target by generating the mask image data indicating the rough region of the target based on the first information and smoothing this mask image data.

The initial likelihood map 540 indicating the rough region of the liver tumor is assumed to express the value of a voxel having a high likelihood of the liver tumor as a value close to 1 (a light color) and the value of a voxel having a low likelihood as a value close to 0 (a dark color) as an example. The generation unit 120 may directly generate the initial likelihood map indicating the rough region of the liver tumor based on the central coordinates of the liver tumor and the radii thereof in the orthogonal three axes, which are the first information, without generating it via the mask image indicating the rough region of the liver tumor.

(Step S3230)

In step S3230, the generation unit 120 generates the likelihood map indicating the likeliness of being the target by correcting the initial likelihood map indicating the rough region of the target to satisfy the constraint set based on the second information with respect to the initial likelihood map indicating the rough region of the liver tumor generated in step S3220. In the present exemplary embodiment, the second information is the liver mask image data. Thus, the generation unit 120 corrects the liver tumor initial likelihood map using the second information including the information indicating the constraint regarding the region of the target "the liver is in the region containing the liver tumor and the liver tumor does not exist outside the region of the liver". In other words, the image data in the second information is image data containing a region of an object containing the target. That is, the generation unit 120 generates the liver tumor likelihood map 550 by correcting the initial likelihood map 540 indicating the rough region of the liver tumor in such a manner that the likelihood of the liver tumor is set to 0 at a voxel outside the region of the liver.

More specifically, the generation unit 120 generates the likelihood map indicating the likeliness of being the region of the liver tumor using the following expression.

$$\hat{p}_i = \begin{cases} p_i & (\text{if } M_i = 1) \\ 0 & (\text{otherwise}) \end{cases} \quad \text{[Expression 2]}$$

$$p_i, \hat{p}_i \quad \text{[Expression 3]}$$

Figure 5E:
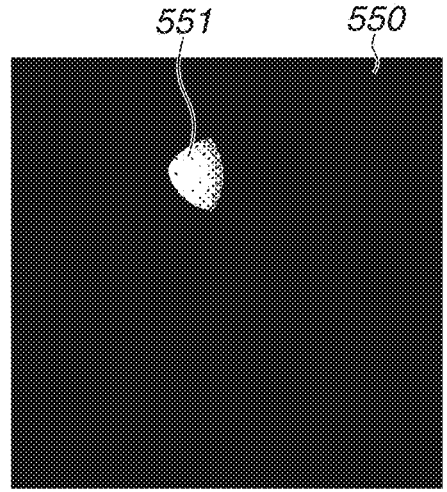

The characters of Expression 3 represent the voxel value (the likelihood) and the voxel value (the likelihood) in the liver tumor likelihood map 550 at a voxel i in the initial likelihood map 540 indicating the rough region of the liver tumor, respectively, and $M_i$ represents the voxel value in the liver mask image data 520, which is the second information. As illustrated in FIG. 5E, the likelihood map 550 indicating the likeliness of being the region of the liver tumor that the generation unit 120 generates by the above-described method is formed as a likelihood map that looks as if being subjected to clipping along the liver region 521, and is formed as a likelihood map that exhibits an expanded shape more resembling the liver tumor 511 in the abdominal CT image 510. The initial liver tumor likelihood map is corrected in such a manner that the likelihood of the liver tumor is set to 0 at a voxel outside the region of the liver in the above-described example, but this correction may be performed by another method as long as this method corrects the initial liver tumor likelihood map in such a manner that the likelihood of the liver tumor decreases at a voxel outside the region of the liver. For example, the likelihood of the liver tumor at a voxel outside the region of the liver can be corrected into a constant close to 0 or can be corrected by multiplying the likelihood $p_i$ indicating the rough region of the liver tumor by a constant smaller than 1. After the above-described processing is ended, step S3200 is ended. Subsequently, referring back to FIG. 3, the processing after that will be described.

(Step S3300)

In step S3300, the generation unit 120 outputs the likelihood map indicating the likeliness of being the region of the liver tumor, and stores it into the storage device 70.

(Step S3400)

In step S3400, the information processing apparatus 100 determines whether there is training image data (abdominal CT image data) about the target to be processed. If there is a training image data of the target to be processed (YES in step S3400), the processing returns to step S3100, and the information processing apparatus 100 performs the ground-truth image generation processing on the remaining training image data. On the other hand, if there is no training image data of the target to be processed (NO in step S3400), the ground-truth image generation processing by the ground-truth image data generation processing unit 101 is ended. By following this procedure, the information processing apparatus 100 according to the present exemplary embodiment generates the liver tumor likelihood map as the ground-truth image data corresponding to the training image data by the ground-truth image data generation processing unit 101. More specifically, the information processing apparatus 100 includes the acquisition unit 110, which acquires the first information including the information indicating the position and the size of the target in the training image data and the second information including the information indicating the constraint regarding the region of this target, and the generation unit 120, which generates the likelihood map indicating the likeliness of being the target based on the first information and the second information as the ground-truth image data corresponding to this training image data. The information processing apparatus 100 with this configuration can efficiently and accurately generate the ground-truth image data.

Subsequently, a processing procedure by the training processing unit 102 in the information processing apparatus 100 will be described with reference to FIG. 6. The processing for training the training model by the training processing unit 102 may be performed by a different information processing apparatus.

At this time, the training processing unit 102 trains the training model by a method based on machine learning using the liver tumor likelihood map generated by the ground-truth image data generation processing unit 101 as the ground-truth image data corresponding to the training image data. Hereinafter, the liver tumor likelihood map generated by the ground-truth image data generation processing unit 101 will be referred to as a ground-truth liver tumor likelihood map for the sake of convenience.

(Step S6100)

In step S6100, the training data acquisition unit 130 acquires a plurality of pieces of abdominal CT image data that is the training image data, and the liver tumor likelihood maps that are the pieces of ground-truth image data corresponding to the pieces of abdominal CT image data, respectively, as training datasets, and transmits them to the training unit 140. In other words, the training data acquisition unit 130 acquires the pieces of training data, assuming that the abdominal CT image 510 and the ground-truth liver tumor likelihood map 550 are one pair of pieces of training data, and transmits them to the training unit 140.

(Step S6200)

In step S6200, the training unit 140 initializes the parameters of the 3D U-Net, which is the training model acquired from the storage device 70 or another source. More specifically, the training unit 140 initializes the weight of a kernel of a convolutional layer by a known method. In the present exemplary embodiment, the convolution layer is initialized using a method for determining the initial value based on a normal distribution proposed by He et al. ([Kaiming He et al.'s "Delving Deep into Rectifiers: Surpassing Human-Level Performance on ImageNet Classification", the International Conference on Computer Vision (ICCV), 2015]). The initialization of the convolution layer is not limited thereto, and can be performed by a known method with a constant value or a random value as an example. Further, in the 3D U-Net that includes a layer having a parameter, such as a batch normalization layer and a dropout layer, the parameter of each layer is initialized by a known method.

(Steps S6300 to S6700)

In steps S6300 to S6700, the training unit 140 receives the training datasets from the training data acquisition unit 130, and trains the 3D U-Net, which is the training model, using the training datasets. The following description is a description of the method for training the 3D U-Net.

In step S6300, the training unit 140 selects a plurality of pieces of training data (a batch) for updating the parameters of the 3D U-Net from the training datasets. Each of the pieces of training data is a pair of an abdominal CT image, which is the training image data, and a ground-truth liver tumor likelihood map, which is ground-truth image data corresponding to the abdominal CT image. In the present step, the training unit 140 selects one or more training data pair(s).

In step S6400, the training unit 140 inputs the abdominal CT image data included in the pieces of training data selected in step S6300 to the 3D U-Net, and performs forward propagation processing. The training unit 140 acquires a plurality of estimated liver tumor likelihood maps corresponding to the pieces of abdominal CT image data input to the training model, respectively, by performing the forward propagation processing.

In step S6500, the training unit 140 calculates a loss value based on the estimated liver tumor likelihood maps acquired in step S6400 and the ground-truth liver tumor likelihood maps corresponding to them. For example, a Mean Squared Error (MSE) is used as the loss function. In addition to the MSE, another known method, such as a Mean Absolute Error (MAE) and Huber, may be used as the loss function.

In step S6600, the training unit 140 calculates a gradient by the back propagation method based on the loss value calculated in step S6500, and updates the parameters of the 3D U-Net. For example, the Stochastic Gradient Descent (SGD) method is used as the optimization method. In addition to the SGD method, another known method, such as the Adam method and AdaGrad method, may be used as the optimization method.

In step S6700, the training unit 140 determines whether a condition for ending the training is satisfied, thereby determining the next step. It is assumed that the condition for ending the training is to reach a preset maximum epoch number as an example. In other words, if the present maximum epoch number is reached (YES in step S6700), the processing proceeds to step S6800. Otherwise (NO in step S6700), the processing returns to step S6300. Another condition may be used as the condition for ending the training. For example, the condition may be that the difference between a loss value in the previous epoch and a loss value in the present epoch satisfies a specified condition.

This is a typical method for training the 3D U-Net which is a training model for inferring a liver tumor likelihood map.

(Step S6800)

In step S6800, the training unit 140 outputs the parameters of the training model, and stores them into the storage device 70.

Through this procedure, the information processing apparatus 100 according to the present exemplary embodiment trains the training model for inferring the liver tumor likelihood map at the training processing unit 102 by the method based on machine learning using the liver tumor likelihood map generated by the ground-truth image data generation processing unit 101 as the ground-truth image data.

In the above-described manner, the information processing apparatus 100 according to the present exemplary embodiment generates the likelihood map of the target (the ground-truth image data) to satisfy the constraint set based on the second information regarding the region of the target based on the first information regarding the position and the size of the target. This enables the ground-truth image data usable to train the training model based on machine learning to be generated with efficiency and accuracy. Further, the training processing unit 102 can train the training model using this ground-truth image data. Furthermore, the inference processing with the training model allows the indication of the position of the target region in image data targeted for inference.

Modifications

The above-described example has been described regarding the method that generates the likelihood map of the target using the central coordinates of the target and the radii thereof in the orthogonal three axes as the first information. The first information may be any other type of information as long as this information includes at least the position and the size. For example, the first information may be the volume of interest (VOI) that surrounds the target or mask image data about an ellipse in a cross-section. If the first information is the VOI that surrounds the target, the initial likelihood map of the target can be generated using a method similar to the above-described example by, for example, treating the centroid of the VOI as the central coordinates of the ellipsoid that is the target and the length of each side of the VOI as the diameter of the ellipsoid. On the other hand, if the first information is the mask image data about an ellipse in a cross-section, an elliptic rotational body (an ellipsoid) is generated, and mask image data about the ellipsoid is generated. This configuration allows generation of the likelihood map of the target using a method similar to the above-described example.

The generation unit 120 generates the mask image data about the ellipsoid based on the central coordinates of the target and the radii thereof in the orthogonal three axes, which are the first information, and generates the initial likelihood map indicating the rough region of the target in an expanded ellipsoidal (to cause the likelihood to change concentrically) based thereon in the above-described example, but the generation of the initial likelihood map is not limited thereto. For example, the generation unit 120 may use a probability function such as a multivariate Gauss function or may generate the initial likelihood map based on the first information using the Euclidean distance from a reference position without going through the mask image indicating the rough region of the liver tumor. These are examples of the method in which the generation unit 120 generates an initial likelihood map in such a manner that the likelihood changes concentrically therein. With the multivariate Gauss function, the generation unit 120 generates the initial likelihood map indicating the rough region of the target by, for example, using the central coordinates of the target as the average value of the multivariate Gauss function and determining the degree of the expansion in the respective axial directions based on the radii of the target. More specific method will be described in a second exemplary embodiment. With the Euclidean distance from a reference position, the generation unit 120 calculates the Euclidean distance voxel by voxel using the contour or the central coordinates of the ellipsoidal region as the reference position, and normalizes the distance value in such a manner that the Euclidean distance of each voxel falls within 0 to 1. At this case, the generation unit 120 normalizes the distance value in such a manner that the likelihood of the target is 0.5 near the outline of the target, and sets the normalized distance value as the likelihood map indicating the likeliness of being the target. The above-described description about the processing by the generation unit 120 corresponds to an example that generates the initial likelihood map indicating the rough region by generating mask image data indicating an approximate distance based on the first information and performing a distance conversion on this mask image data.

The above-described example has been described regarding the method in which the generation unit 120 generates the likelihood map of the target by approximating the target with the ellipsoid, but the approximation of the target may be performed by any method among known methods as long as the shape can approximate the target based on the first information indicating at least the position and the size. For example, With a target that has a shape closer to a column (a spinal column or the like), the generation unit 120 can generate the likelihood map of the target using a method similar to the above-described example by generating mask image data about the column using information regarding the radius and the height of the column as the first information. Similarly, with a target that has a shape close to a cuboid, the generation unit 120 uses the length of each side of the cuboid as the first information. Besides them, in some embodiments, the generation unit 120 approximates the region of a target using a parametric shape model. In this case, a dependent parameter for expressing the parametric shape model is provided to the generation unit 120 as the first information. The parametric shape model refers to, for example, a function of a closed surface or a statistical shape model. In other words, the first information includes the parameters of the parametric shape model expressing the outline of the target. Then, the generation unit 120 generates the likelihood map indicating the likeliness of being the target based on the first information including the parametric shape model and the information indicating the position and the size of the target, and the second information.

The generation unit 120 uses the mask image data about the region of the object containing the target as the second information in the above-described example, but the second information is not limited thereto. For example, the second information may be mask image data indicating a region of an object adjacent to (or circumscribed on) the target. If the target is the liver tumor, the liver tumor exists adjacent to, for example, a kidney and a rib bone, and the advantageous effects of the present disclosure can be achieved by causing the generation unit 120 to set the likelihood to 0 at a voxel in a region indicated by mask image data about them. Further, the second information may be mask image data acquired by performing threshold value processing on a possible voxel value to allow the generation unit 120 to determine a region where the target is highly likely to exist in the training image data about the target. Any mask image data generated outside the information processing apparatus 100 according to the present exemplary embodiment may be used as long as this mask image data can serve as a constraint regarding the region of the target in this manner. Alternatively, the generation unit 120 may use a continuous value map that indicates a prior probability regarding the target. In this case, the generation unit 120 corrects the initial likelihood map of the target by multiplying the initial likelihood map of the target generated based on the first information by a value in the prior probability map voxel by voxel.

The information processing apparatus 100 uses the method based on deep learning such as the 3D U-Net as the training model in the above-described example, but the training model is not limited thereto. For example, Support Vector Machine (SVM) or a classification tree based on another machine learning technique may be used as the training model. In this case, an appropriate training method is selected depending on the training model.

The second exemplary embodiment will be described. In the first exemplary embodiment, the generation unit 120 generates the initial likelihood map indicating the rough region of the target based on the first information. Then, the generation unit 120 generates the likelihood map indicating the likeliness of being the target by correcting the initial likelihood map to satisfy the constraint set based on the second information. Such a stepwise method has been described in the first exemplary embodiment. In the present exemplary embodiment, the generation unit 120 determines a partial region for generating the likelihood map indicating the likeliness of being the target based on the second information with respect to the training image data. Then, the generation unit 120 generates the likelihood map indicating the likeliness of being the target by calculating the likelihood of the target based on the first information with respect to this partial region. In other words, the present exemplary embodiment will be described regarding a method in which the information processing apparatus 100 determines the likelihood at each voxel in the likelihood map based on the first information to satisfy the constraint set based on the second information. Now, the partial region is a region indicating a region where the target is highly likely to exist.

In the present exemplary embodiment, the information processing apparatus 100 uses a lower limit value and an upper limit value of the CT number possible to be acquired in the region of the liver tumor set as the target as the second information, and generates the likelihood map indicating the likeliness of being the region of the liver tumor while imposing the constraint in such a manner that the likelihood of the liver tumor is set to 0 at a voxel outside the range defined by the lower limit value and the upper limit value.

More specifically, the information processing apparatus 100 first generates mask image data indicating the partial region where the liver tumor is highly likely to exist by performing determination processing based on threshold value processing on the abdominal CT image data using the lower limit value and the upper limit value of the voxel value possible to be acquired in the region of the liver tumor.

Then, the information processing apparatus 100 generates the liver tumor likelihood map in such a manner that the likelihood of the liver tumor is set based on the central coordinates of the liver tumor and the radii thereof in the orthogonal three axes, which are the first information, with respect to each voxel contained in the region where the liver tumor is highly likely to exist, and that the likelihood of the liver tumor is set to 0 at a voxel other than that.

In the present exemplary embodiment, the generation unit 120 calculates the likelihood of the liver tumor at each voxel using the multivariate Gauss function. In other words, the information processing apparatus 100 according to the present exemplary embodiment generates the likelihood map indicating the likeliness of being the region of the liver tumor using the central coordinates of the liver tumor and the radii thereof in the orthogonal three axes, which are the first information, as the parameters of the multivariate Gauss function.

The information processing apparatus 100 according to the present exemplary embodiment is configured similarly to the information processing apparatus 100 according to the first exemplary embodiment. In the following description, the functional configuration of the information processing apparatus 100 according to the present exemplary embodiment will be described with reference to FIG. 1, and the redundant descriptions common to the information processing apparatus 100 according to the first exemplary embodiment will be omitted as appropriate.

The storage device 70 stores therein the abdominal CT image data that is the training image data in which the target is imaged, and the central coordinates of the liver tumor and the radii thereof in the orthogonal three axes as the first information, similarly to the first exemplary embodiment. Further, the storage device 70 stores therein a lower limit value $t_{lower}$ and an upper limit value $t_{upper}$ of the CT number possible to be acquired in the region of the liver tumor as the second information, which is the information indicating the constraint regarding the region of the target.

The acquisition unit 110 acquires the abdominal CT image data that is the training image data about the target, the central coordinates of the liver tumor and the radii thereof in the orthogonal three axes, which are the first information, and the lower limit value and the upper limit value of the CT number possible to be acquired in the region of the liver tumor, which are the second information, from the storage device 70, and transmits them to the generation unit 120.

The generation unit 120 first acquires the abdominal CT image data that is the training image data about the target, the central coordinates of the liver tumor and the radii thereof in the orthogonal three axes, which are the first information, and the lower limit value and the upper limit value of the CT number possible to be acquired in the region of the liver tumor, which are the second information, from the acquisition unit 110. Next, the generation unit 120 generates the mask image data about the partial region where the liver tumor is highly likely to exist by performing the threshold value processing on the abdominal CT image data using the lower limit value and the upper limit value of the CT number possible to be acquired in the region of the liver tumor, which are the second information. Subsequently, the generation unit 120 generates the likelihood map indicating the likeliness of being the region of the liver tumor while imposing the constraint in such a manner that the likelihood of the liver tumor is set to 0 at a voxel outside the partial region where the liver tumor is highly likely to exist. Then, the generation unit 120 stores the generated likelihood map indicating the likeliness of being the region of the liver tumor into the storage device 70 as the ground-truth image data corresponding to the training image data.

The training data acquisition unit 130 is similar to the first exemplary embodiment, and the description thereof will be omitted here.

The training unit 140 is similar to the first exemplary embodiment, and the description thereof will be omitted here.

The hardware configuration of the information processing apparatus 100 according to the present exemplary embodiment is similar to the first exemplary embodiment, and the description thereof will be omitted here.

Next, a processing procedure performed by the ground-truth image data generation processing unit 101 in the information processing apparatus 100 according to the present exemplary embodiment will be described with reference to FIG. 3. In the following description, the redundant portions of the information processing apparatus 100 according to the first exemplary embodiment will be omitted.

(Step S3100)

In step S3100, the acquisition unit 110 acquires the abdominal CT image data that is the training image data about the target, the central coordinates of the liver tumor and the radii thereof in the orthogonal three axes, which are the first information, and the lower limit value and the upper limit value of the CT number possible to be acquired in the region of the liver tumor, which are the second information, from the storage device 70.

Then, the acquisition unit 110 transmits them to the generation unit 120.

(Step S3200)

Figure 7:
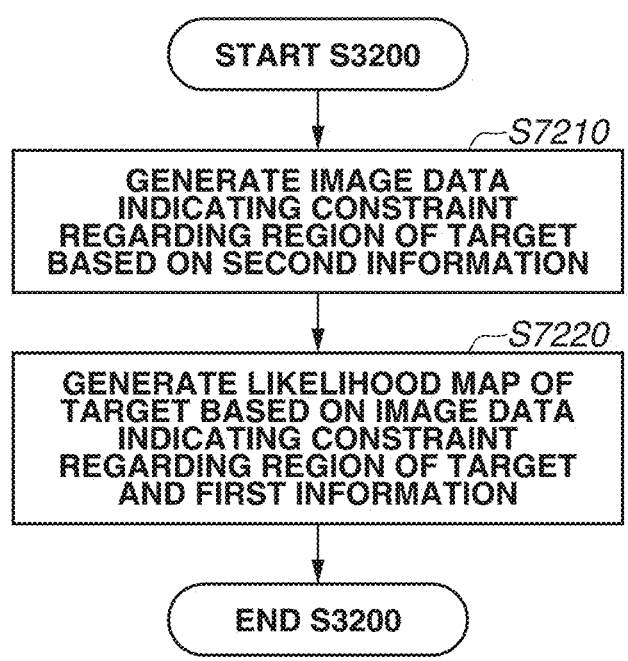
FIG. 7 illustrates an example of a processing procedure by an information processing apparatus according to a second exemplary embodiment.

In step S3200, the generation unit 120 receives the abdominal CT image data that is the training image data about the target, the central coordinates of the liver tumor and the radii thereof in the orthogonal three axes as the first information, and the lower limit value and the upper limit value of the CT number possible to be acquired in the region of the liver tumor as the second information. Next, the generation unit 120 generates the mask image of the partial region where the liver tumor is highly likely to exist based on the lower limit value and the upper limit value of the CT number possible to be acquired in the region of the liver tumor, which are the second information. Then, the generation unit 120 generates the likelihood map indicating the likeliness of being the region of the liver tumor based on the mask image data about the partial region where the liver tumor is highly likely to exist, and on the central coordinates of the liver tumor and the radii thereof in the orthogonal three axes, which are the first information. In the following description, step S3200 according to the present exemplary embodiment will be described in detail with reference to FIG. 7.

(Step S7210)

In step S7210, the generation unit 120 generates the mask image data about the partial region where the liver tumor is highly likely to exist by performing the threshold value processing on the abdominal CT image data using the lower limit value and the upper limit value of the CT number possible to be acquired in the region of the liver tumor, which are the second information, as threshold values.

More specifically, the generation unit 120 determines the voxel value $M_i$ of the mask image data about the partial region where the liver tumor is highly likely to exist using the following expression.

$$M_i = \begin{cases} 1 & (\text{if } t_{lower} \leq I_i \leq t_{upper}) \\ 0 & (\text{otherwise}) \end{cases} \quad \text{[Expression 4]}$$

In Expression 4, $I_i$ represents the voxel value in the abdominal CT image data, and $t_{lower}$ and $t_{upper}$ represent the lower limit value and the upper limit value of the CT number possible to be acquired in the region of the liver tumor, respectively. The mask image data about the partial region where the liver tumor is highly likely to exist is assumed to express the value of a voxel contained in the partial region where the liver tumor is highly likely to exist as 1, and the value of a voxel other than that as 0.

(Step S7220)

In step S7220, the generation unit 120 generates the likelihood map indicating the likeliness of being the region of the liver tumor based on the mask image data about the partial region where the liver tumor is highly likely to exist, and the central coordinates of the liver tumor and the radii thereof in the orthogonal three axes, which are the first information. In the present exemplary embodiment, with the first information that further includes a parameter of a probability distribution function, the generation unit 120 generates the likelihood map indicating the likeliness of being the target based on the first information including the probability distribution function and the information indicating the position and the size of the target, and the second information. The generation unit 120 here generates the liver tumor likelihood map using the multivariate Gauss function, which is the probability distribution function, with respect to the partial region where the liver tumor is highly likely to exist. More specifically, the generation unit 120 sets the value of each voxel (the likelihood of the liver tumor) in the liver tumor likelihood map using the following expression.

$$p_i = \begin{cases} \exp(-(\vec{x}_i - \vec{c})^T \Sigma^{-1} (\vec{x}_i - \vec{c})) & (\text{if } M_i = 1) \\ 0 & (\text{otherwise}) \end{cases} \quad \text{[Expression 5]}$$

$$\vec{x}_i = (x, y, z)^T \quad \text{[Expression 6]}$$

Expression 6 represents a vector indicating the coordinates of the voxel i in the image coordinate system.

$$\vec{c} = (c_x, c_y, c_z)^T \quad \text{[Expression 7]}$$

Expression 7 represents a vector indicating the central coordinates of the liver tumor in the image coordinate system. Further, $\Sigma$ is a covariance matrix, and functions as a parameter that determines the degree of the expansion of the likelihood distribution in the liver tumor likelihood map. Especially, diagonal components in the covariance matrix are the following variances in the X-axis, Y-axis, and Z-axis directions.

$$\sigma_x^2, \sigma_y^2, \sigma_z^2 \quad \text{[Expression 8]}$$

Then, they determine the degree of the expansion in the respective axial directions. Thus, the generation unit 120 determines the degree of the expansion in the respective axial directions based on the radii of the liver tumor in the orthogonal three axes.

$$\sigma_x^2, \sigma_y^2, \sigma_z^2 \qquad \text{[Expression 9]}$$

These variances are determined. As an example, the variance in the X-axis direction is determined using the following expression.

$$\sigma_x^2 = \frac{r_x^2}{\log(2)} \qquad \text{[Expression 10]}$$

The variances in the Y-axis and Z-axis directions are also determined using similar expressions. With the likelihood calculated in this manner, the liver tumor likelihood map can be generated in such a manner that the likelihood of the liver tumor is 0.5 at a voxel near the outline of the liver tumor.

After the above-described processing is ended, step S3200 is ended. Subsequently, referring back to FIG. 3, the processing after that will be described.

(Step S3300)

The present step is similar to step S3300 in the first exemplary embodiment, and the description thereof will be omitted here.

(Step S3400)

The present step is similar to step S3400 in the first exemplary embodiment, and the description thereof will be omitted here.

By following this procedure, the information processing apparatus 100 according to the present exemplary embodiment generates the liver tumor likelihood map by the ground-truth image data generation processing unit 101. Then, the information processing apparatus 100 trains the training model for inferring the liver tumor likelihood map by the method based on machine learning using the liver tumor likelihood map as the ground-truth image following a processing procedure similar to the training processing unit 102 according to the first exemplary embodiment.

In the above-described manner, the information processing apparatus 100 according to the present exemplary embodiment generates the likelihood map indicating the likeliness of being the target to satisfy the constraint set based on the second information regarding the region of the target based on the first information regarding the position and the size of the target as the ground-truth image data corresponding to the training image data. As a result, the ground-truth image data usable to train the training model based on machine learning can be generated with efficiency and accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-192190, filed Nov. 26, 2021, which is hereby incorporated by reference herein in its entirety.

What is claimed is:

1. An information processing apparatus comprising:
a memory storing instructions, and
at least one processor configured to perform the instructions to:
acquire first information including information indicating a position and a size of a target in training image data and second information including information indicating a constraint regarding a region of the target;
generate a likelihood map indicating likeliness of being the target as ground-truth image data corresponding to the training image data, wherein the likelihood map is a map generated to approximate a shape of the target based on the first information and the second information;
acquire training data including the ground-truth image data that is generated based on the first information and the second information and the training image data; and
train a training model using the training data.

2. The information processing apparatus according to claim 1, wherein the at least one processor is configured to generate an initial likelihood map regarding the region of the target based on the first information, and
generate the likelihood map indicating the likeliness of being the target by correcting the initial likelihood map based on the second information.

3. The information processing apparatus according to claim 2, wherein the at least one processor is configured to generate the initial likelihood map by generating mask image data indicating the region of the target based on the first information and smoothing the mask image data.

4. The information processing apparatus according to claim 2, wherein the at least one processor is configured to generate the initial likelihood map by generating mask image data indicating the region of the target based on the first information and performing a distance conversion on the mask image data.

5. The information processing apparatus according to claim 1, wherein the at least one processor is configured to generate the likelihood map indicating the likeliness of being the target by determining a partial region for generating the likelihood map indicating the likeliness of being the target with respect to the training image data based on the second information and calculating a likelihood of the target with respect to the partial region based on the first information.

6. The information processing apparatus according to claim 5, wherein the partial region is a region where the target is highly likely to exist.

7. The information processing apparatus according to claim 1, wherein the first information further includes a parameter of a probability distribution function, and the at least one processor is configured to generate the likelihood map indicating the likeliness of being the target based on the probability distribution function and the first information including the information indicating the position and the size of the target, and the second information.

8. The information processing apparatus according to claim 1, wherein the first information further includes a parameter of a parametric shape model expressing an outline of the target, and the at least one processor is configured to generate the likelihood map indicating the likeliness of being the target based on the first information including the parametric shape model and the information indicating the position and the size of the target, and the second information.

9. The information processing apparatus according to claim 1, wherein the second information is image data.

10. The information processing apparatus according to claim 9, wherein the second information is image data indicating a region of an object containing the target.

11. The information processing apparatus according to claim 9, wherein the second information is image data indicating a region of an object located adjacent to the target.

12. The information processing apparatus according to claim 5, wherein the second information is information regarding a threshold value for determining a region where the target is highly likely to exist.

13. The information processing apparatus according to claim 1, wherein the at least one processor ii configured to perform inference processing using the training model trained by using the training data.

14. An information processing method comprising:
acquiring training image data, first information including information indicating a position and a size of a target in the training image data, and second information including information indicating a constraint regarding a region of the target;
generating a likelihood map indicating likeliness of being the target as ground-truth image data corresponding to the training image data, wherein the likelihood map is a map generated to approximate a shape of the target based on the first information and the second information;
acquiring training data including the ground-truth image data generated by the generating and the training image data; and
training a training model using the training data.

15. The information processing method according to claim 14, further comprising performing inference processing using the training model generated by the training.

16. A non-transitory storage medium storing a program for causing a computer to carry out an information processing method comprising:
acquiring training image data, first information including information indicating a position and a size of a target in the training image data, and second information including information indicating a constraint regarding a region of the target;
generating a likelihood map indicating likeliness of being the target as ground-truth image data corresponding to the training image data, wherein the likelihood map is a map generated to approximate a shape of the target based on the first information and the second information;
acquiring training data including the ground-truth image data generated by the generating and the training image data; and
training a training model using the training data.

17. The information processing apparatus according to claim 1, wherein the training model is trained to perform inference processing on a likelihood map such that likelihood of a region of an object where the target is highly unlikely to exist, which is identified based on the second information, is lower than likelihood of a region of an object where the target is highly likely to exist.

18. An information processing system comprising:
a first information processing apparatus comprising:
a memory storing instructions, and
at least one processor configured to perform the instructions to:
acquire first information including information indicating a position and a size of a target in training image data and second information including information indicating a constraint regarding a region of the target; and
generate a likelihood map indicating likeliness of being the target as ground-truth image data corresponding to the training image data, wherein the likelihood map is a map generated to approximate a shape of the target based on the first information and the second information, and
a second information processing apparatus comprising:
a memory storing instructions, and
at least one processor configured to perform the instructions to:
acquire training data including the ground-truth image data that is generated based on the first information and the second information and the training image data; and
train a training model using the training data.

* * * * *